Figure 9:
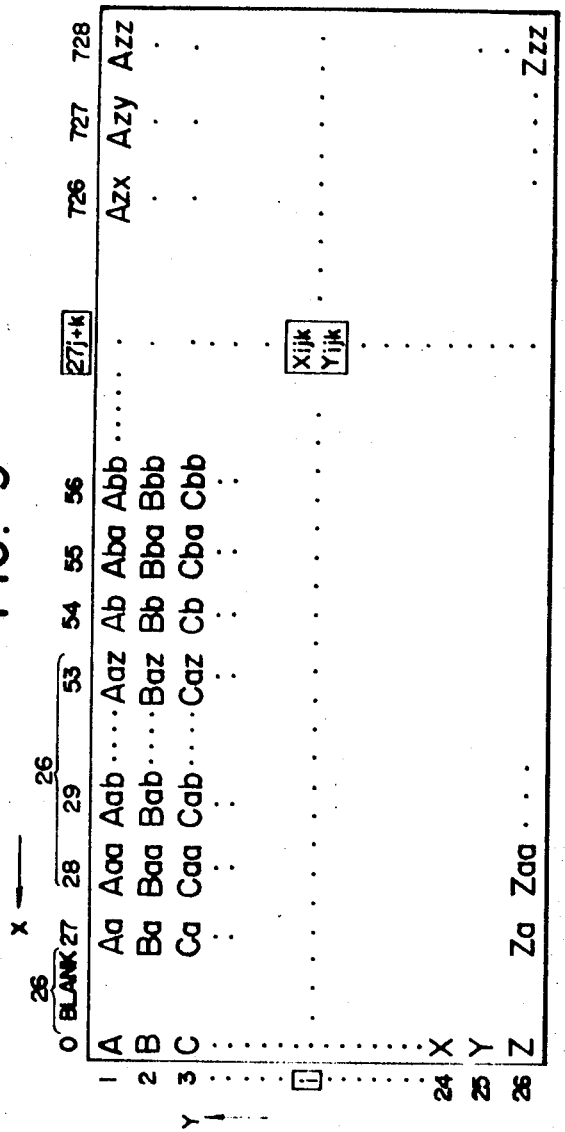

United States Patent

[11] 3,612,676

[72] Inventors Seiichi Ooba;
Shingo Ooue; Hiroyuki Ueda; Masakazu Hashiue; Hirotoshi Endo; Makoto Murakoshi; Masashi Yanagida, all of Asaka-shi, Saitama, Japan
[21] Appl. No. 778,079
[22] Filed Nov. 22, 1968
[45] Patented Oct. 12, 1971
[73] Assignee Fuji Photo Film Co., Ltd.
Kanagawa, Japan
[32] Priority Nov. 29, 1967
[33] Japan
[31] 42/76657

[54] DICTIONARY-READING DEVICE
9 Claims, 14 Drawing Figs.
[52] U.S. Cl. .................................................. 353/27,
353/120, 35/6, 35/35 R
[51] Int. Cl. ......................................................... G03b 23/08
[50] Field of Search ........................................... 353/25, 26, 27, 122, 121, 87, 120; 35/6, 35 R

[56] References Cited
UNITED STATES PATENTS

| | | | |
|---|---|---|---|
| 2,690,697 | 10/1954 | Rocca ........................ | 35/6 UX |
| 3,302,513 | 2/1967 | Papayannopoulos ......... | 353/27 |
| 3,426,451 | 2/1969 | Hoffmann .................... | 35/35 R |
| 3,457,010 | 7/1969 | Philipp ........................ | 353/26 |
| 3,509,651 | 5/1970 | Robbins et al. .............. | 353/27 X |

Primary Examiner—William D. Martin, Jr.
Attorney—Sughrue, Rothwell, Mion, Zinn & MacPeak ABSTRACT: A dictionary reader coupled with a key device having a set of keys corresponding to phonetic signs of the language used in the dictionary. By striking the keys in the order of a word, the page of the dictionary bearing the word is projected on a screen of the reader. The reader employs a microfilm projector when the film is driven so as to bring the image of the desired page on the film into alignment with the optical axis of the projector.

PATENTED OCT 12 1971 3,612,676
SHEET 1 OF 4
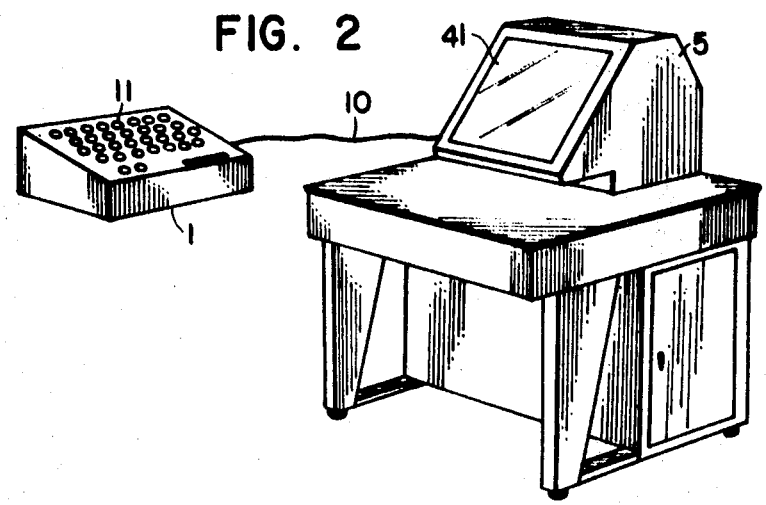

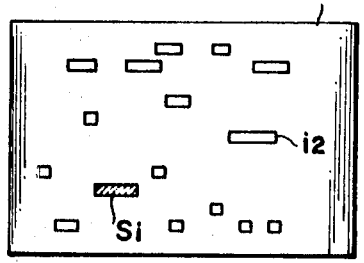
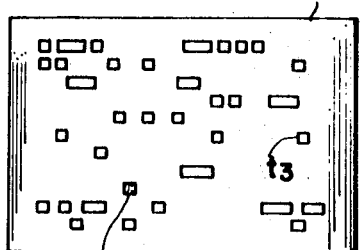
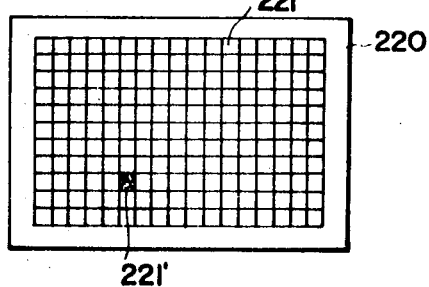
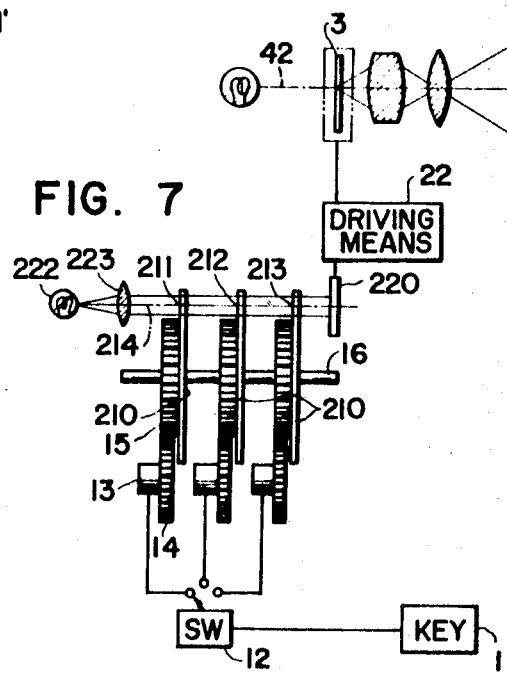

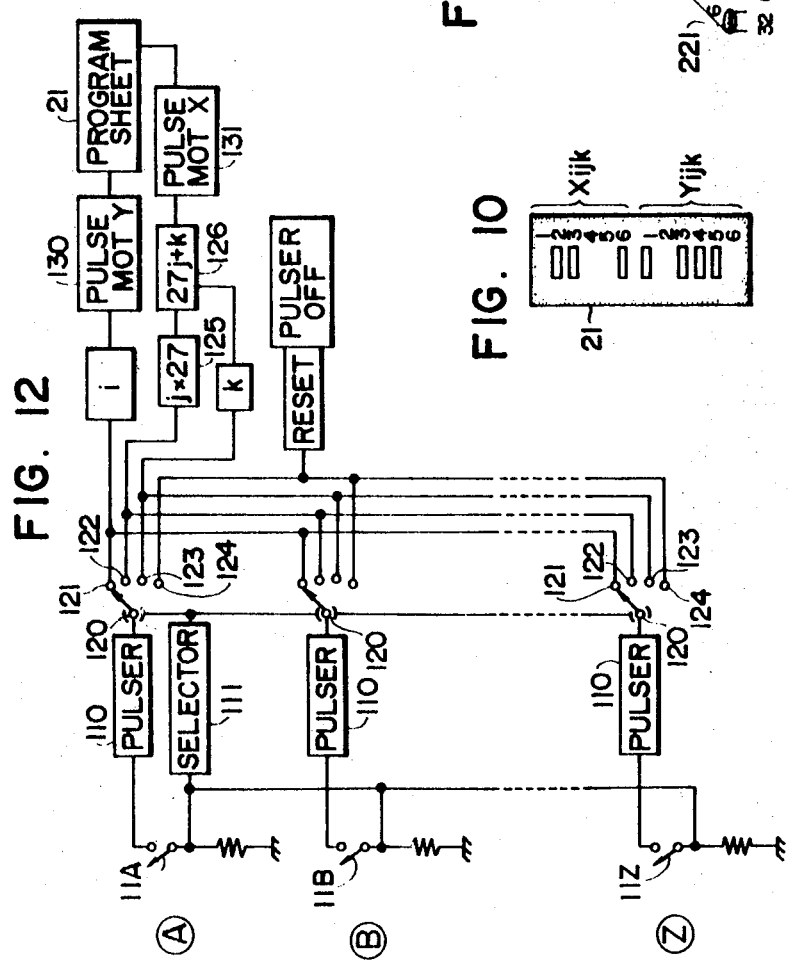

DICTIONARY-READING DEVICE

The present invention relates to a dictionary-reading device and the like wherein the desired portion of the photographic image of a dictionary page is recorded on microfilm and is projected on the screen by striking the keys of phonetic signs in the order of the heading word. More particularly, an optical reading device is disclosed for reading or consulting a dictionary such as a one-language dictionary, two-language dictionary, dictionaries of technical terms, or encyclopedias of various kinds which have headings of phonetic signs. The desired page of a dictionary is recorded on a film such as microfilm. The image of the desired page of the dictionary is then projected on a screen and the portion wherein the desired heading is carried in response to the striking of the keys of phonetic signs in the order of the heading word.

Generally, encyclopedias or dictionaries are thick and heavy and are troublesome to carry and handle. Most libraries only have one set of such large encyclopedias which limits the number of people which can read it at one time. Also, because the headings are arranged in alphabetical order in these dictionaries it is difficult for those who don't know or who cannot remember the order of the alphabet like foreigners or children to look up the desired word. It is also time consuming and laborious to carry these heavy books to the desk and to open them to the desired page.

It is an object of the present invention to eliminate the difficulties as described above and provide a device wherein an image of a dictionary page recorded on a sheet of microfilm is projected on a screen so that the page which carries the desired word is magnified and projected on the screen by striking the keys of phonetic signs in the order of the word.

The other objects will be apparent from the foregoing description taken in conjunction with the accompanying drawings in which:

FIG. 1 is a block diagram showing the basic construction of the reading device in accordance with the present invention, FIG. 2 is a perspective view of the appearance of an embodiment of the recording device in accordance with the present invention, FIG. 3 is a block diagram showing an embodiment of the reading device utilizing a programmed sheet in accordance with the present invention, FIG. 4 is a plan view of an embodiment of a sheet of microfilm having the images of a dictionary in accordance with the present invention, FIGS. 5a through 5c are plan views showing masks used in the first embodiment of the present invention, FIG. 6 is a plan view showing a plate having photoconductive elements used in the first embodiment of the present invention, FIG. 7 is a schematic side view showing the construction of the reading device in accordance with the first embodiment of the present invention, FIG. 8 is a perspective view of the mask-driving mechanism used in the first embodiment for the first invention, FIG. 9 is a plan view of a program sheet used in the second embodiment illustrated in FIG. 3, FIG. 10 is an enlarged view of a portion of the program sheet of FIG. 9, FIG. 11 is an enlarged side view of an optical retrieval system for projecting the image of a portion of a program sheet on the photoconductive element plate, and FIG. 12 is a view of a circuit showing the transmission circuit for connecting the keys to a pulse motor for driving the program sheet.

Referring now to FIG. 1 showing the block diagram with the basic components of the present invention, a key device 1 having a plurality of keys arranged thereon corresponding to the phonetic signs of a word, controls a retrieval device 2 which selects the record on the film 3 in response to the input signal by striking the keys. Film 3 has recorded on it pages of a dictionary or the like. The selected record on the film 3 is projected on a screen by means of a projecting device 4.

The key device 1 is made as small and as light as possible and is connected to the reading device body 5 with a flexible cord 10 as shown in FIG. 2 so that the key device 1 may be moved wherever desired. The arrangement of the keys 11 of the phonetic signs is arranged so that anyone can easily find the desired key. The keys 11 may be arranged in alphabetical order or arranged such as the keys of a standard typewriter. If the latter arrangement is used, the keys can be striken without being seen. In cases where the phonetic signs are not the alphabet such as $a, b, c$,—but $a, i, u, o$ as in Japanese or other signs which correspond to other languages, the arrangement of the keys is set according to the particular order of the phonetic signs.

Film 3 may be of conventional microfilm, however, super microfilm is preferred in order that higher resolving power can be obtained. Using the super microfilm, the size of the device can be greatly miniaturized and the device becomes easy to handle. The dictionary is recorded on the super microfilm. A single page or two pages as they appear when a book is opened are recorded as one frame on the film 3 and the frames are arranged in a single row or parallel rows. The rate of reduction in recording may be 1/200, but for practical purposes the rate is desired to be between 1/50 to 1/100. In the case of a rate of 1/100, an English-Japanese dictionary of 504 pages of 155×85 mm.$^2$ was recorded on a film of 55 mm.×48 mm. with the interval corresponding to the width of a frame in the lateral and transverse direction.

The projecting device 4 is a device for magnifying and projecting the image on the film 3 and has a light source and projection optical system which can project the image on a screen 41. The screen 41 need not be provided in the projecting device 4 if it is desired to print the image on the film rather than to read it. One has various control knobs such as brightness control, focus control, etc. can be placed upon the projecting device 4. However, these knobs may also be disposed on the keying device 1 so that all of the controls may b easily accessible and easily movable from one position to another.

The retrieval device 2 disposed between the keying device 1 and the film 3 has a device for bringing the optical axis of the optical projecting system into alignment with the image frame of the image carrying the desired dictionary word in response to signals made by striking the keys 11 in the order of the phonetic signs of the word. The retrieval device 2 may be constructed mechanically or electrically, but generally an electrical device utilizing electric signals is superior to the mechanical device in size and weight. The retrieval device 2 is disposed in the reading device body portion 5 together with a projecting device 4.

The operation of an embodiment of the present invention will now be described using an example of a word from the English dictionary. Referring to FIG. 4, image frames 30 each being a page of the dictionary are recorded on film 3 in the order that they appear in the dictionary. By bringing the frame 30 into alignment with the optical axis of the projecting device 4, the page recorded in the image frame 30 is projected on the screen 31.

There are various film-driving systems which may be employed to select, for example, frame 300 among the frames 30 on the film 3. In the embodiment now being described, an automatic electric balance-type X-Y direction film-driving mechanism is employed.

In this type of film-driving mechanism, there are two separate systems used; one of which drives the film in the horizontal or X direction and the other drives the film in the vertical or Y direction. Each system of the film-driving mechanism is operated by an input signal produced by striking the keys 11 on the device 1 so that the desired image frame 300 is brought into alignment with the optical axis of the projecting device 4.

The following device may be employed as an automatic electric balance-type X-Y correction film-driving mechanism. A voltage corresponding to the column-driving number of the desired frame on the film is produced in a position-signal-generating circuit and is applied through a motor to an amplifier for driving the film in one direction, and a voltage corresponding to the row number of the desired frame on the film is also generated and applied to a motor for driving the film in a particular direction with respect to said driving direction. Thus, the desired image frame 300 is brought into alignment with the axis of the projecting device.

In the following embodiments, the mechanism for transmitting the input signal of the keys 11 to the X-Y direction film-driving mechanism will be described in detail.

Embodiment 1. Referring to FIGS. 5a, b, and c, code means comprising masks 211, 212, and 213 are shown. The masks are approximately the same size as film 3. If the English word "sit" is to be retrieved, for example, three masks are superimposed together by means which will be described later. One mask, 211, having a transparent portion S1 which corresponds to that portion of the film 3 at which image frames having pages of a dictionary containing words having the letter "S" for their initial letter is moved into position. A second mask, 212, having a transparent portion I2 which corresponds to that portion of the film 3 at which image frames having pages of the dictionary containing words having the letter "I" for their second letter is also moved into position. A third mask 213 having a number of transparent portions T3 which correspond to that portion of the film 3 at which image frames having pages of the dictionary containing words having the letter "T" for their third letter of the word is also moved into position.

Referring now to FIG. 6, photoconductive elements plate 220 has a number of photoconductive elements 221 arranged in the positions corresponding to the image frames 30 on the film 3. Each photoconductive element 221 is independently connected to the X-Y direction-driving mechanism electrically so that the film 3 is driven in accordance with the signal from the photoelectric element 221 which is irradiated with light. When the photoelectric element 221' is irradiated with the light, a circuit for applying a voltage which corresponds to the X-Y coordinate of he image frame 300 corresponding to the irradiated photoconductive element 221' is closed, and the film 3 is driven so that the image frame 300 is brought into alignment with the optical axis of the projecting device. When the three above-mentioned superimposed masks 211, 212 and 213 are further superimposed with photoconductive elements plate 220 and a combination thereof is irradiated with light, a photoconductive element 221' the position of which corresponds to the position of the image frame 300 having words of "sit" is irradiated and the film 3 is driven so that the image frame 300 is brought into alignment with the optical axis of the projecting device by means of the X-Y direction-driving device.

FIGS. 7 and 8 show the means in the first embodiment for superimposing the three masks 211, 212 and 213 and the photoconductive plate 220. The reference number 210 denotes a transparent plate having a mask 211 of 26 different types angularly arranged with equal intervals. Each mask corresponds to one of the 26 letters of the alphabet. The transparent plate 210 is rotatably mounted on a shaft 16 with the other two transparent plates also designated as 210 which have masks 212 and 213 respectively. Each transparent plate 210 has a toothed wheel 15 coaxially fixed thereon. Each tooth wheel 15 is engaged by a tooth wheel 14 which is rotated by a pulse motor 13. The pulse motor 13 is driven by the output signal of the key device 1 to a switch 12. The switch 12 is closed and then advanced to its next position every time the key 11 is struck. The key 11 of the key device 1 is connected to a pulse generator (not shown) disposed in the key device 1. The pulse-generating device generates a number of pulses corresponding to the alphabetical order of the phonetic sign of the key; in the case of an "S, " which is the 19 letter of the alphabet, the pulse generator connected to the key of "S" will generate 19 pulses. The 26 sheets of masks 211, 212 and 213 are arranged in alphabetical order by each transparent plate 210. The light from the light source 222 of the optical system in the retrieval means is made parallel by the lens 223 and is then irradiated onto the photoconductive elements plate 220.

When the key 11 is struck, a pulse signal having the number of pulses corresponding to the kind of letter indicated thereon is generated and the pulse motor 13 is driven through the switch 12. The mask 211 corresponding to the letter of the key struck is brought into alignment with the optical axis 214 of the retrieval optical system. This operation is repeated three times by the staggered switch of switch 12 and the three masks are then superimposed. As can be seen, this superimposing operation is optically accomplished by projecting the image of the first mask 211 onto the second mask 212, and then projecting the image of the second mask 212 with the projected image of the first mask 211 onto the third mask 213, and then projecting the image of the third mask 213 onto the photoconductive elements plate 220. By superimposing the masks in this manner, the masks are very sharply superimposed, and the size of the mask 211, 212, 213 and the photoconductive plate 220 is made small and the device itself can be miniaturized. After being irradiated with light, the photoconductive element 221' transmits a signal to the film-driving device. The image frame of the film 3 carrying the word desired is then brought into alignment with the projecting optical axis and the image of the page of the dictionary is projected on a screen 41.

In the above embodiment, the keys are struck three times. In this case, sometimes a plurality of image frames have the same first three letters such as "con...," a plurality of photoconductive elements are irradiated at the same time. To eliminate this, the keys may be struck three times in order to eliminate the aforementioned trouble, because more than two pages will not have the same first five letters in English or in any other language. This number of strikings can be determined in accordance with the language or the kind of dictionary.

Embodiment 2. FIG. 3 discloses a block diagram of the second embodiment of the invention. In this embodiment, a code means comprising program sheet 21 is used for transmitting the input signal of X and Y components of the coordinate of the image frame to the X-Y direction film-driving device. The signal is made for the combinations of the first three letters. Referring now to FIG. 9, all the combinations of the first three letters are arranged in alphabetical order on the program sheet 21. The combination of the letters is coded and printed on the program sheet. For instance, the codes of a combination of the letters are printed on a photographic material such as a negative film so that the code is made of transparent image on an opaque film. By means of the code on the program sheet 21, the film 3 is brought into position wherein the image frame of the film 3 corresponding to the page of the dictionary having the word of the same first three letters as that represented by the code, is aligned with the optical axis of the projecting device. Thus, the program sheet, when put into the device, will retrieve the desired word in the dictionary and project the image of the page containing the word on the screen 41.

Referring to FIG. 10, showing the embodiment of the code card used in the second embodiment, the coordinate of a combination of three letters is represented by several codes, one of which is for the X component and the other of which is for the Y component. These patterns are in the form of transparent spots. The positions and the number of the transparent spots represent the combination of the three letters. This code is projected on the photoconductive elements plate 221 by means of a projection optical system 223 as shown in FIG. 11 and the signal from the photoconductive elements is transmitted to the film-driving device. The program sheet 21 is driven by a pulse motor that will be described later.

Referring now to FIG. 12, an electric circuit is shown for transmitting the input signal produced by striking the keys 11 of the key device 1 to the program-sheet-driving mechanism. The electric switches directly connected to or integral with the keys 11 are connected to a pulse-generating device 110 for generating the number of pulses corresponding to the alphabetical order of the letter on the key. The pulse-generating device 110 is connected to pulse motors 130, 131 by a switch 120. The switch 120 has four terminals or contacts 121, 122, 123, and 124. The contact 121 is connected to the pulse motor 130, the other two contacts 122 and 123 are connected to the pulse motor 131. The contact 124 is connected to a reset and cutoff means for the pulse-generating device. The pulse motor 130 is provided to move the program sheet 21 in the Y direction, whereas, the other pulse motor 131 is provided for moving the program sheet 21 in the X direction. Each key 11 is connected to a selector for switching the switch 120 when the key is struck once. The letter A is represented by one pulse, the letter B is represented by two pulses and the letter Z is represented by 26 pulses. Located between the second contact 122 and the pulse motor 131, is a device 125 for multiplying the input pulse 27 times. Also located therebetween is a device 126 for adding the pulse from the third contact 123 to the pulse from the device 125.

The operation of the device disclosed in the second embodiment will now be described in conjunction with retrieving the word "baby."

Initially, the key 11b of the letter 37 B" which has two pulses is struck. The pulse generator 110 generates two pulses which are transmitted to the pulse motor 130 through the switch 120 and the first contact 121. The pulse motor 130 drives a program-sheet-driving mechanism and moves the program sheet 21 by two pulse lengths in the Y direction, whereby the position of "B" on the program sheet 21 is brought into alignment with the optical axis of the retrieval optical system 223. At this instant, the selector 111 is operated to rotate the switch 120 to the second contact 122. Secondly, a key 11a of the letter "A" which is represented by one pulse, is struck. The pulse generator 110 then generates one pulse, which is transmitted to the multiplying device 125 through the contact 122 and is changed into 27 pulses. The pulse motor 131 is provided with 27 pulses to move the program sheet by 27 pulse lengths in the X direction, whereby the position of "Ba" is brought into alignment with the optical axis 214 of the retrieval optical system 223. At this instant, the switch 120 is rotated into the third contact 123 by means of the selector 111. And thirdly, the key 11b is again struck, and the pulse generator 110 generates two pulses which are transmitted to the pulse motor 131 through the switch 120 and contact 123. The pulse motor 131 moves the program sheet 21 by two pulses lengths in the x direction, whereby the position of "Bab" is brought into alignment with the optical axis 214.

By this method, the position of "Bab" on the program sheet 21 is brought into alignment with the optical axis 214 of the retrieval optical system 223 by striking the keys 11 in the order of B, A, B. The position of "Bab" on the program sheet 21 is a code which permits the film-driving device to move the film 3 into the position wherein the image frame of the page carrying the word "bab.." such as "baby" is put into alignment with the projecting optical axis of the projecting device. Therefore, when the keys 11 of the key device 1 are struck three times in the order of the spelling of the word, the code on the program sheet corresponding to the first three letters struck by the keys is brought into alignment with the optical axis of the retrieval optical system, and the code is projected on the photoconductive elements plate which transmits the signal of the code to the film-driving device. Thus, the image frame on the film 3 having the word corresponding to the spelling of the word, as it is struck, is brought into alignment with the optical axis of the projecting device, whereby the image of the page of the dictionary is projected on the screen. It should be noted, that after the third key is struck, the switch 120 is connected to the point contact 124 and the key device is reset.

While only two different embodiments have been described above, various kinds of other embodiments can be made using the basic block diagram shown in FIG. 1. For instance, the image frames themselves can be arranged on the program sheet used in the second embodiment. This will eliminate the optical system and the code-carrying program sheet used in the second embodiment. That is to say, the program sheet carrying the image frames would be directly projected by the projecting optical system onto a screen. In this simplified variation, the keys which are struck would be more than three in number in order to eliminate the case wherein the words having the same first three letters are carried on more than one page.

The invention has been described in detail with reference to some embodiments thereof, but it will be understood that variations and modifications can be effected within the spirit and scope of the invention as described hereinabove and defined in the appended claims.

What is claimed is:

1. A dictionary-reading device comprising:
   a. a film on which the pages of the dictionary are recorded as photographic images;
   b. key means for providing, when actuated, an input to said device wherein said key means includes a plurality of keys each representing a phonetic sign;
   c. projecting means for projecting said photographic images on a viewer;
   d. code means having a plurality of coded portions thereon, each of said coded portions corresponding to a portion of said film with one of said images recorded thereon;
   e. code reader means for reading the coded portion of said code means;
   f. first positioning means, responsive to said key means, for positioning said code means with respect to said code reader means in accordance with the actuation of said key means;
   g. impulse-generating means for generating impulses in response to the code read by said code reader means;
   h. second positioning means, responsive to said impulses for positioning said film with respect to said projecting means whereby the position of the film corresponds to the input to the device.

2. The device of claim 1 wherein said coded portions of said code means are transparent.

3. The device of claim 2 wherein said code reader comprises a light source and a photoconductive element wherein the light from said light source passes through said coded portions of said code means and impinges on said photoconductive element.

4. The device of claim 1 wherein said code means comprises a program sheet.

5. The device of claim 4 wherein said first positioning means comprises:
   a. pulse-generating means responsive to said key means for producing a series of pulses corresponding to said key means which have been actuated; and
   b. pulse motors responsive to said pulse-generating means, said pulse motors positioning said program sheet.

6. The device of claim 1 wherein said code means comprises a plurality of discs positioned on a common axis each disc having coded portions thereon such that the alignment of said coded portions of each disc with respect to the other and with respect to said code reader means corresponds to said key means which have been actuated.

7. The device of claim 6 wherein said first positioning means comprises a plurality of pulse motors each of said plurality of pulse motors corresponding to one of said plurality of discs.

8. A dictionary reading device according to claim 1 wherein said means for projecting said photographic image comprises a light source and an optical system.

9. A dictionary reading device according to claim 1 wherein said means for bringing the image containing the desired word to said projecting means consists of two separate systems, one of which drives the film in a horizontal direction and the other of which drives the film in a vertical direction in response to electrical impulses produced by striking the keys of said keying device.